May 19, 1964 W. C. MANN 3,134,032

ERROR CANCELING DECISION CIRCUIT

Filed March 23, 1962

WITNESSES

Wm. B. Sellers.

Dean Schron

INVENTOR

William C. Mann.

BY

Ernest P. Klipfel

ATTORNEY

United States Patent Office 3,134,032
Patented May 19, 1964

3,134,032
ERROR CANCELING DECISION CIRCUIT

William C. Mann, Laurel, Md., assignor to Westinghouse Electric Corporation, East Pittsburgh, Pa., a corporation of Pennsylvania Filed Mar. 23, 1962, Ser. No. 182,070
6 Claims. (Cl. 307—88.5)

This invention in general relates to redundant logic systems, and in particular to a circuit for use in such systems which circuit will cancel errors which may occur.

Redundant systems are used in many types of electrical circuits and are particularly adapted for use in electronic computers. Generally, if a failure of a particular circuit occurs in such an electronic computer, an erroneous output or control results which necessitates a replacement of the faulty circuit, which may be a time-consuming operation. To eliminate erroneous readings and time-consuming maintenance, various computers have been built with entire duplicate systems such that if one system fails another system will be switched in to take its place. Other computers use some sort of redundant circuitry wherein signals are duplicated by the use of redundant components and various logic signal sensing elements such as AND devices, OR devices, etc. These two systems require a great deal of extra circuitry, thus increasing cost and complexity.

It is an object of the present invention to provide a decision circuit for a redundant system which circuit eliminates the need for logic signal sensing devices.

It is a further object of the present invention to provide a decision circuit which more efficiently locates failures and eliminates the effects of these failures without shutting down an entire system.

It is a further object to provide a redundant system decision circuit which operates on differential currents caused by non-agreeing redundant input signals.

Another object of the present invention is to provide a decision circuit which will cancel erroneous signals and be operable thereafter to function as a majority voter.

Another object of the present invention is to provide a decision circuit which will eliminate erroneous signals and will be operable thereafter to give a correct output signal when only two input signals remain.

It is a further object of the present invention to provide a decision circuit which will eliminate erroneous signals and possibly give a correct output signal when only one input signal remains.

Briefly, in accordance with the above-cited objects, there is provided a decision circuit for use in a redundant logic system, which circuit is operable to receive a plurality of input signals from a previous stage. A plurality of parallel input lines is provided to receive the input signals and all of the lines are connected to a high input impedance threshold device. In order to remove an input line receiving an erroneous or incorrect signal, means are provided and may take the form of a current responsive device which functions to open circuit the erring line after a predetermined time duration. The threshold device operates as a means for receiving the signals in each of the lines to provide an output signal in accordance with those input signals. The threshold device will still provide a correct output signal in accordance with the input signals even after a predetermined number of lines have been removed from the circuit. This predetermined number may be governed by the choice and value of current required to actuate the current responsive device and the current responsive device itself in each particular line. For example, values may be chosen such that when only three input lines remain operating, no additional lines will be removed upon the occurrence of an incorrect signal and the circuit will operate as a two out of three majority voter. Alternatively, values may be chosen such that a correct output will be provided when only two lines remain in the circuit. If desired, values may be chosen such that only one line remains in the circuit at which time there is a certain chance that the threshold device will provide a correct output signal.

The above-stated and other objects will become more clearly apparent after a study of the following specification when read in connection with the accompanying drawings, in which.

Figure 1:
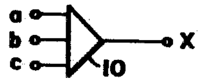
FIGURE 1 shows an element which may be used in a non-redundant computing system.

Referring now to FIG. 1, there is shown a logic element, which may be used in a computing system, having three inputs *a*, *b* and *c* which will produce an output X. If the components within the element 10 fail, the output X will be destroyed, thus causing erroneous results.

Figure 2:
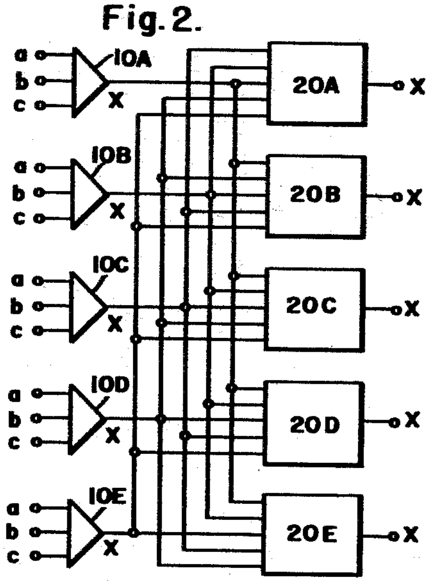
FIG. 2 shows one use of the present invention in a redundant version of FIG. 1.

FIG. 2 shows the redundant version of FIG. 1 in which a redundancy in the order of five is utilized. Instead of one element 10, to produce an output X, there is provided five such elements 10A through 10E with each receiving the inputs *a*, *b* and *c* and each operative to provide the ouput X. The present invention shown in block diagram and having the general numeral character 20 finds use in such a redundant system. It may be seen that each of the circuits 20A through 20E each receive an output from each one of the elements 10A through 10E. Each of the circuits 20A to 20E then provide an X output, and will continue to do so even after a predetermined number of the elements 10A through 10E fail to provide an X output.

Figure 3:
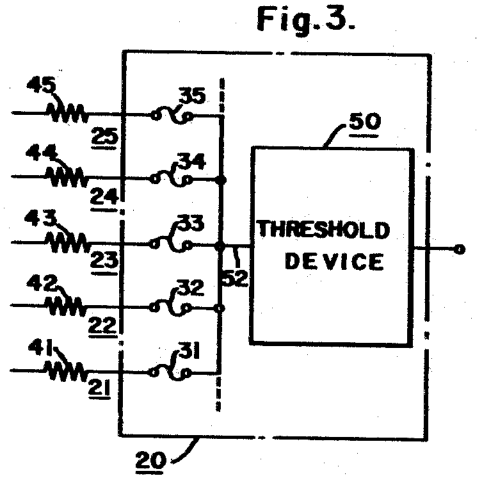
FIG. 3 shows the preferred embodiment of the present invention.

FIG. 3 shows in more detail the preferred embodiment of the present invention. The decision circuit 20 is comprised of a plurality of input lines 21 to 25, however, it is to be understood that any reasonable number of input lines may be provided depending upon the order of redundancy of the previous circuit. Means are provided in each line to eliminate that particular line from the circuit should a non-agreeing signal occur on that line, which means takes the form of current responsive devices 31 through 35, and in its simplest form may be a fuse or a circuit breaker. Each line is shown to have a respective resistance 41 through 45 which may represent, for example, the output impedance of a previous circuit, the resistance of the lines themselves, and any additional resistance or impedance which might be desired to be put in each line and which total impedance in each line is small relative to the input impedance of threshold device 50. It is to be understood further that these resistances 41 through 45 have substantially equal values. Each of the lines 21 through 25 is connected to an input of a threshold device such as a threshold element 50 having a high input impedance and which functions to provide an output in accordance with its input voltage which in turn is dependent upon the number of lines providing correct input signals. Such threshold elements are generally well known in the art, and one example of such a circuit will be discussed with reference to FIG. 4.

In operation, assume that each of the input lines 21 through 25 are each receiving correct input signals, that is, each one is receiving an identical signal which may be for example all binary ones, or all binary zeros.

The input impedance to circuit 50 is very high and consequently there is little or no differential current flow between any of the input lines. The threshold device 50 will then be providing an output in accordance with the correct input signals. If now one of the input lines provides a signal that is incorrect, that is, differing from the other input signals, a flow of current will occur in that line. By way of example, if line 21 receives a binary zero while lines 22 through 25 receive binary ones, current from the latter lines will flow up through line 21 including the current responsive device, or fuse, 31. If the response of fuse 31 is instantaneous, it will melt and cause an open-circuiting of line 21, thus eliminating the erroneous signal from the decision circuit. If the response of fuse 31 is not instantaneous, it will cause the removal of line 21 from the circuit at some predetermined time after the occurrence of the erroneous signal, which time is dependent upon the rating of the current responsive device 31 and the number of times that the input signals on the remaining lines disagree with the input signal on the erring line in a given period of time.

In a given system, the input signals on lines 21 to 25 may be rapidly changing binary states in a given period of time. During this period of time, any incorrect input signal which disagrees with a correct input signal may eventually cause actuation of a current responsive device to remove the erring line. During this disagreement period, the threshold device 50, will continue to give a correct output in accordance with the correct inputs since the voltage at the input to the threshold device 50 will be continuously on the correct side of the threshold voltage of threshold device 50 due to the preponderance of correct signals over the erroneous signals. If the remaining four lines 22 to 25 then receive binary one input signals, the threshold element 50 will then provide a binary one output signal, and if the remaining lines 22 through 25 receive binary zero input signals, the threshold element 50 will provide a zero value output signal. If now an incorrect signal is received by another line, for example 25, the current responsive device 35 will be operative to remove line 25 from the circuit in a manner similar to the removal of line 21 such that the threshold element 50 will provide a proper output in accordance with signals on the three remaining lines. If it is desired to have the decision circuit operate as a two out of three majority voter circuit, the value of the current responsive devices 31 through 35 may be chosen such that when only three lines remain in the circuit, an error in one of them will not cause an elimination of that line from the circuit due to a differential current flow through its respective current responsive device. In that instance, if all three lines receive correct input signals, the threshold element 50 will provide a correct output signal. If two out of the three remaining lines receive correct input signals and the third receives an incorrect input signal, the threshold element 50 will still continue to provide an output signal in accordance with the majority of input signals, that is, it will produce an output the same as the two correct inputs. If now two of the three remaining lines receive incorrect signals and the remaining line receives a correct signal, the majority of input signals will govern and the threshold device 50 will provide an incorrect output signal.

As an alternative, the ratings of the current responsive devices may be chosen such that when three input lines remain, and an error occurs on one of them, the differential currents set up will be enough to cause the current responsive device in the erring line to remove that line from the circuit which will then operate with only two input lines. The threshold element 50 will then be responsive to the input signal on the remaining two lines to provide a correct output, and if one of these input signals becomes incorrect, each line will receive the same differential flow of current, and there will be a certain chance that the line receiving the erring signal will be eliminated from the circuit.

The particular form of threshold device utilized in the present invention will depend, amongst other things, on the input voltage patterns. The operation of the present invention has been described by way of example with respect to a voltage pattern of binary ones and binary zeros, where the binary one may be for example, a negative voltage, and the binary zero may be for example, a zero or ground voltage. With such a voltage pattern, the threshold element may take the form of a voltage threshold actuated bistable circuit such as is shown in more detail in FIG. 4.

Figure 4:
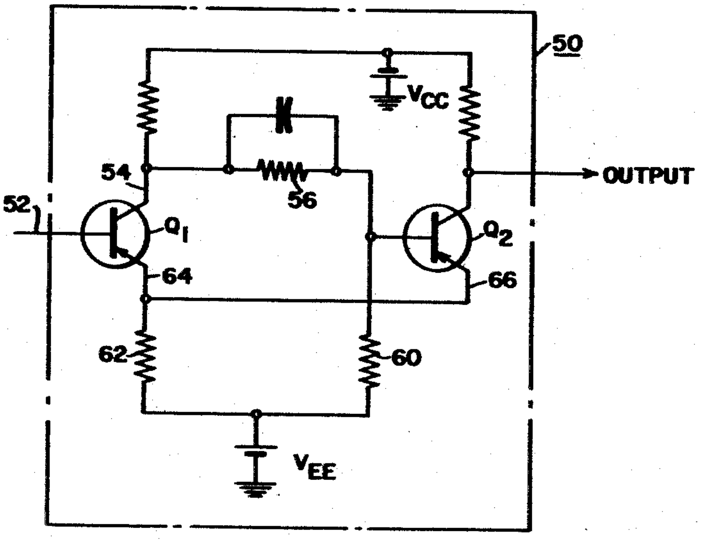
FIG. 4 shows in more detail one circuit which may be used as the threshold device of FIG. 3.

In the operation of the circuit of FIG. 4, assume that at an instant of time no input signals appear on base-input 52 of transistor Q1, and that transistor Q1 is cut off. The voltage at collector 54 of transistor Q1 is then equal to the battery voltage $V_{CC}$, which voltage is also coupled to the base 58 of transistor Q2 through resistor 56. The voltage at the base 58 of transistor Q2 is then determined by this coupled voltage and also the voltage drop across resistor 60 and is sufficient to allow Q2 to conduct. It may be seen that resistor 62 is common to the emitters 64 and 66 of transistors Q1 and Q2 and current flow from battery $V_{EE}$ through resistor 62 to emitter 66 of transistor Q2 maintains the emitter 64 of transistor Q1 at a negative potential which keeps Q1 in a cut off condition. Q2 now remains conducting due to the negative potential at its base 58. If a negative input signal of sufficient amplitude representing a binary one from lines 21 to 25 is now applied at a next instant of time to base 52 of transistor Q1, it will overcome the reverse bias and cause Q1 to conduct. The conductor of Q1 decreases the potential at collector 54 which decrease is coupled to the base 58 of transistor Q2 decreasing its emitter current which in turn causes the emitter 64 of transistor Q1 to become less negative thereby increasing collector current. This regenerative action continues until such time as transistor Q1 is operating in its saturation region and transistor Q2 is cut off thus producing a binary one negative output voltage. The parameters of the threshold device 50 will usually be chosen such that the voltage at which the binary state changes is approximately half way between the binary one input voltage and the binary zero input voltage and the output of threshold device 50 will change states in accordance with the changing states of the input signals.

Although the present invention has been described with a certain degree of particularity, it should be understood that the present disclosure has been made by way of example and that numerous changes in the details of construction and the combination and arrangement of parts may be resorted to without departing from the spirit and scope of the invention.

What is claimed is:

1. A decision circuit for use in redundant logical systems comprising in combination: a plurality of input lines each for receiving one of a like plurality of similar input signals, each input line including a current responsive device; said plurality of input lines interconnected such that when all of said input signals agree, there is substantially no current flow in said lines and when at least one input signal disagrees, a flow of current will occur to cause the current responsive device in the disagreeing line to remove that line from said decision circuit; and a threshold device connected to said input lines for sensing said input signals to provide an output signal in accordance with said similar input signals and to provide said same output signal even after a predetermined flow of said current and even after a predetermined number of lines have been removed from said circuit by said current responsive devices.

2. A decision circuit for use in redundant logic systems, comprising in combination: a plurality of parallel input lines for receiving similar correct input signals; means located in each of said lines for removing said line from said circuit in response to a predetermined flow of current in said line, said predetermined flow of current being caused by an incorrect input signal; and a threshold element connected to each of said input lines to provide a correct output signal in response to a predetermined number of correct input signals and a predetermined number of removed lines.

3. An error canceling circuit for use in a redundant logic system comprising in combination: a plurality of input lines for receiving redundant information signals; a threshold device having a high input impedance relative to the impedance of said lines and having a single input connected to all of said input lines so that substantially no current flows between said input lines when said information signals agree; a current responsive device located in each input line for removing its respective line from said circuit in response to a predetermined current, said predetermined current caused by disagreement of said redundant information signals, said removal being effected after a predetermined duration of disagreement between said redundant information signals; said high input impedance threshold device operable to provide an output signal in agreement with a predetermined number of unremoved input lines.

4. A decision circuit for use in redundant logical systems comprising in combination: a plurality of input lines each for receiving a similar input signal, each input line including current responsive means; said plurality of input lines having substantially equal impedances and interconnected such that when all of said input signals agree, there is substantially no current flow in said lines and when at least one input signal disagrees, a flow of current will occur into the disagreeing line from the correct lines to cause a current responsive means in the disagreeing line to remove that line from said decision circuit; the value of said current responsive means chosen such that when three lines remain no additional lines will be removed from said decision circuit upon the occurrence of additional disagreeing signals and a threshold device connected to said input lines for sensing said input signals to provide an output signal in accordance with said similar input signals and to provide an output signal when only three lines remain, in accordance with the majority of input signals on said three remaining lines.

5. An error canceling circuit for use in a redundant logic system comprising in combination: a plurality of input lines having substantially equal impedances, for receiving redundant information signals; a threshold device having a high input impedance relative to the impedance of said lines and having a single input connected to all of said input lines so that substantially no current flows between said input lines when said information signals agree; a current responsive device located in each input line for removing its respective line from said circuit in response to a predetermined current, said predetermined current caused by disagreement of said redundant information signals, said removal being effected after a predetermined duration of disagreement between said redundant information signals, and the value of said current responsive device chosen so that when two lines remain, they will not be removed by disagreement of input signals; said high input impedance threshold device operable to provide an output signal in agreement with a desired input signal on at least one of two unremoved input lines.

6. An interpath decision circuit for use in redundant logic systems; comprising in combination: a plurality of parallel input lines for receiving similar correct input signals; means located in each of said lines for removing said line from said circuit in response to a predetermined flow of current in said line, said predetermined flow of current being caused by an incorrect input signal, said last named means chosen so that when two lines remain, an incorrect signal appearing on one of them will cause one of them to be removed from said circuit; and a threshold element connected to each of said input lines to provide an output signal in response to a single input signal; and to provide an output signal which is correct in response to at least one correct input signal.

No references cited.